(12) United States Patent
Yu

(10) Patent No.: US 6,757,034 B2
(45) Date of Patent: Jun. 29, 2004

(54) FLAT PANEL DISPLAY AND METHOD OF ADJUSTING A DISPLAY SCREEN THEREOF

(75) Inventor: Ming-Teh Yu, Tu-Chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 49 days.

(21) Appl. No.: 10/175,990

(22) Filed: Jun. 19, 2002

(65) Prior Publication Data

US 2003/0090863 A1 May 15, 2003

(30) Foreign Application Priority Data

Nov. 9, 2001 (TW) .......................................... 90127848 A

(51) Int. Cl.⁷ ............................................. G02F 1/1335
(52) U.S. Cl. ........................ 349/58; 349/345; 349/211; 361/683
(58) Field of Search ........................... 349/58; 345/211; 361/683

(56) References Cited

U.S. PATENT DOCUMENTS 5,946,062 A * 8/1999 Hasegawa et al. ............ 349/58
6,052,275 A * 4/2000 Joseph ........................ 361/683
2003/0076315 A1 * 4/2003 Yu .............................. 345/211

FOREIGN PATENT DOCUMENTS

EP          0009939      * 4/2000
JP          401178951 A  * 7/1989

* cited by examiner

*Primary Examiner*—Huyen Ngo
(74) *Attorney, Agent, or Firm*—Wei Te Chung

(57) ABSTRACT

A flat panel display (10) and a method of adjusting display characteristics of a display screen (300) of the flat panel display is the subject of the present invention. The flat panel display includes a power switch button (101) and several control buttons (102), all of which are positioned on a side frame surface (100). The flat panel display provides "On Screen Display" (OSD) software. When the OSD software is driven, indicating symbols (302) indicating the positions and functions of the flat panel display, so that a user can adjust display characteristics of the display screen easily using the control buttons. Thus, adjustment of display characteristics is effected, and the flat panel display has an aesthetically pleasing appearance.

11 Claims, 5 Drawing Sheets

FLAT PANEL DISPLAY AND METHOD OF ADJUSTING A DISPLAY SCREEN THEREOF

BACKGROUND OF THE INVENTION

1. Field of the Invention

The present invention relates to flat panel displays, and particularly to a flat panel display with control buttons positioned at a side thereof and a method of adjusting a display screen of the flat panel display.

2. Description of Prior Art

Conventional Cathode Ray Tube (CRT) displays have the following drawbacks: large volume, high operating voltage, high electricity consumption, and high radiation. Hence modem display units being developed are characterized by small volume, low voltage, low electricity consumption, and low radiation. Flat panel displays are among the most popular of such modern display units. The variety of flat panel displays now existing include liquid crystal displays (LCDs), electronic luminescent displays, light-emitting diode displays, plasma displays and vacuum fluorescent displays. In recent years, LCDs have become increasingly widespread in various fields. For example, liquid crystal front projectors (front-projection type) and liquid crystal rear projectors (rear-projection type) are used for public presentations. Such projectors can clearly project enlarged images of personal computer screens when such screens are LCDs (direct-view type). Such LCDs have become well established as the most popular kind of display units apart from CRT displays.

A typical display unit has an array of function buttons for adjusting various display characteristics of a display screen of the display unit. Such characteristics include size, position, brightness, contrast, and time clock. The buttons are controlled by an integrated circuit (IC). The buttons of a conventional flat panel display are positioned on a front bezel of a frame of the flat panel display, below a display screen of the flat panel display. Each button is accompanied by a distinguishing symbol that indicates the function of the button. In a conventional display unit, each display characteristic is controlled by a separate button having a corresponding symbol. When numerous display characteristics are adjustable, manufacturing of the display unit is complicated by the numerous buttons, and the size of the display unit is unduly large.

FIG. 5 shows one kind of conventional display unit. A power button 21 and a plurality of adjusting buttons 22 are positioned on a front bezel 20 of a frame of the display unit, below a display screen of the display unit. Symbols (not labeled) indicating the functions of the adjusting buttons 22 are printed above the adjusting buttons 22. When one of the adjusting buttons 22 is pressed, a main menu of "on screen display" (OSD) software appears on the display screen automatically. Guided by the main menu, a user can press the adjusting buttons 22 to adjust various display characteristics of the display screen. Since the adjusting buttons 22 and the symbols are positioned on the front bezel 20 of the frame, the size of the display unit is unduly large.

Thus, it is desired to provide a flat panel display which overcomes the above-mentioned problems. A copending application with an unknown serial number filed Jun. 5, 2002, titled "FLAT PANEL DISPLAY AND METHOD OF ADJUSTING A DISPLAY SCREEN THEREOF", with the same application and the same assignee as the invention, discloses one approach.

SUMMARY OF THE INVENTION

Accordingly, an object of the present invention is to provide a light and thin flat panel display.

A another object of the present invention is to provide a flat panel display which is aesthetically pleasing and easily manufactured.

A further object of the present invention is to provide a method of adjusting display characteristics of a display screen of a flat panel display that fulfils the aforementioned objects.

To achieve the above objects, the present invention provides a flat panel display and a method of adjusting display characteristics of a display screen of the flat panel display. The flat panel display comprises a power switch button and a plurality of control buttons. The power switch button and the control buttons are positioned on a side of the flat panel display. The flat panel display provides "On Screen Display" (OSD) software. When the OSD software is driven, symbols indicating the positions and function of the control buttons are displayed on the display screen of the flat panel display, so that a user can adjust the display characteristics of the display screen easily.

Other objects, advantages and novel features of the present invention will be drawn from the following detailed description of a preferred embodiment of the present invention with attached drawings, in which:

DETAILED DESCRIPTION OF PREFERRED EMBODIMENT

Figure 1:
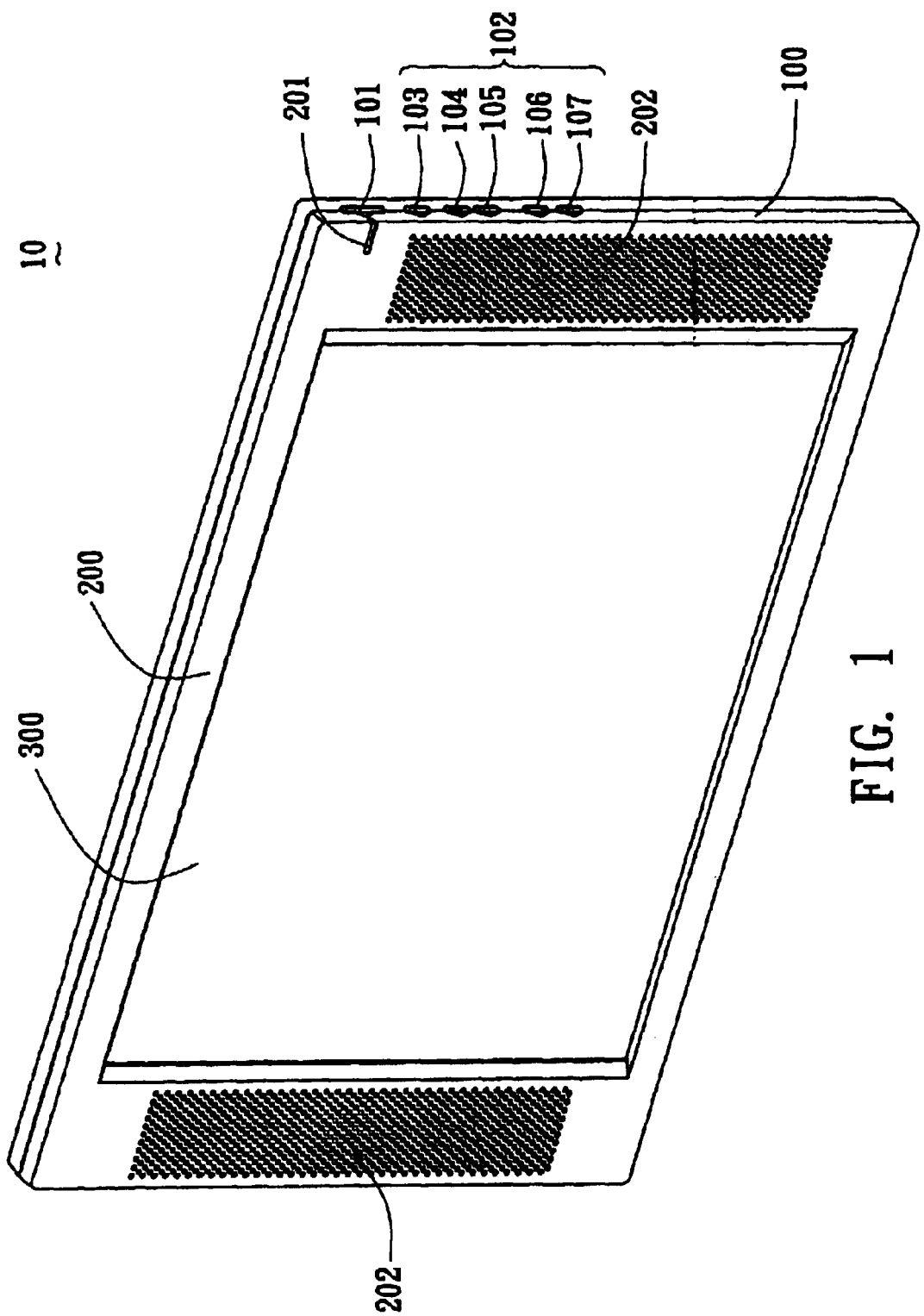
FIG. 1 is a perspective view of a flat panel display in accordance with a preferred embodiment of the present invention.

Referring to FIG. 1, a flat panel display 10 in accordance with a preferred embodiment of the present invention comprises a frame (not labeled), a display screen 300, a pair of speakers 202, a power switch button 101, an indicating light 201 and a set of control buttons 102. The frame comprises a side frame surface 100, and a front frame surface 200 around a periphery of the display screen 300. The power switch button 101 and the control buttons 102 are positioned in the frame on the side frame surface 100. The control buttons 102 are positioned in vertical alignment below the power switch button 101. The control buttons 102 comprise, in order from top to bottom, a first function button 103, adjusting buttons 104, 105, a second function button 106, and an automatic adjusting button 107. The automatic adjusting button 107 is for adjusting geometry, time clock and pixel phase of the display screen 300 automatically. The indicating light 201 is positioned in the frame on the front frame surface 200, at a same level as the power switch button 101. The indicating light 201 is for indicating an on or off status of the power switch button 101. The speakers 202 are respectively arranged at opposite sides of the display screen 300, behind the front frame surface 200.

Figure 2:
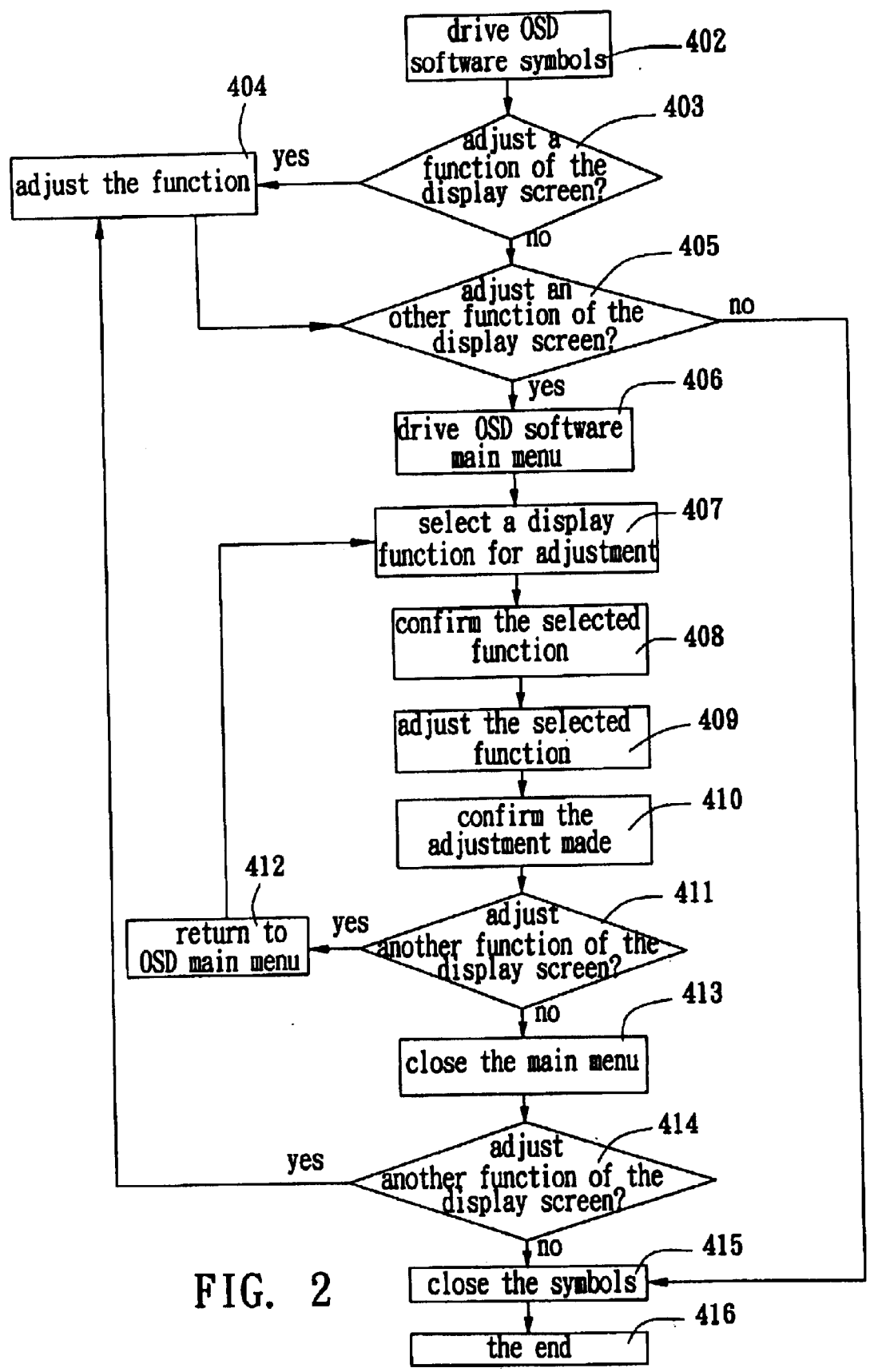
FIG. 2 is a flow chart of a method of adjusting display characteristics of a display screen of a flat panel display in accordance with a preferred embodiment of the present invention.

FIG. 2 is a flow chart of a method for adjusting display characteristics of the display screen 300 of the flat panel display 10 in accordance with the present invention. In step 402, a user of the flat panel display 10 presses any one of the control buttons 102, which automatically drives the OSD software to display the indicating symbols 302 (see FIG. 3) on the display screen 300. The indicating symbols 302 respectively indicate functions and positions of the function buttons 102 and the power switch button 101. In step 403, the user decides whether to adjust a function of the display screen 300. If the user decides to adjust a function of the display screen 300, then in step 404 the user presses the automatic adjusting button 107 to adjust geometry, time clock or pixel phase of the display screen 300 automatically, or the user presses the second function button 106 to adjust volume of the speakers 202. If the user decides not to adjust the above-mentioned function, the procedure logically proceeds to step 405.

Figure 3:
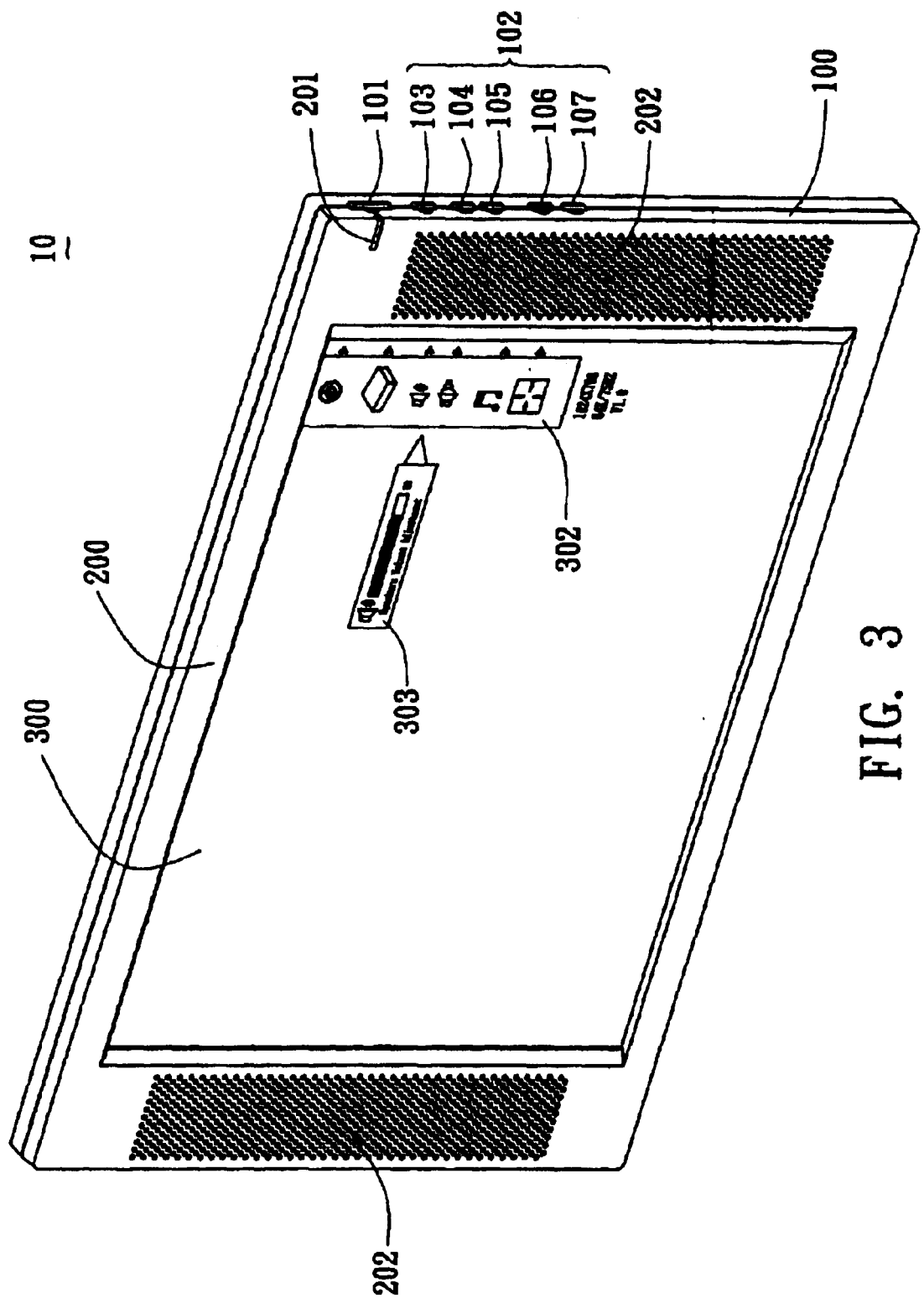
FIG. 3 is similar to FIG. 1, but showing a volume adjustment bar and indicating symbols displayed on a display screen of the flat panel display.

FIG. 3 shows the flat panel display 10 after the user presses the second function button 106, thereby selecting to adjust the volume of the speakers 202. A volume adjustment bar 303 appears near the indicating symbols 302. A length of the darkened position of the adjustment bar 303 indicates a degree of the volume. Guided by the indicating symbols 302, the user can press the adjusting buttons 104, 105 to adjust the volume of the speakers 202. When the adjusting button 104 is pressed, the darkened position of the volume adjustment bar 303 extends rightward, and the volume of the speakers 202 is progressively turned up. When the adjusting button 105 is pressed, the adjustment bar 303 recedes leftward, and the speakers 202 are progressively turned down. When the second function button 106 is pressed a second time, the volume adjustment bar 303 disappears. The adjusted speak volume result is stored automatically.

In step 405, the user decides whether to adjust other function of the display screen 300. If the user decides not to adjust another function, the user does nothing and follows step 415. The indicating symbols 302 disappear (step 414) after one of the buttons 102 has not been pressed within 5 seconds and step 415 is thereby reached. If the user decides to adjust another function, then within 5 seconds the user must press the first function button 103 (step 406), which automatically drives the OSD software to display a main menu 301 (see FIG. 4) on the display screen 300. In step 407, the user presses the adjusting buttons 104 or 105 to select a display function for adjustment. In step 408, the user presses the first function button 103 to confirm the selected function.

Figure 4:
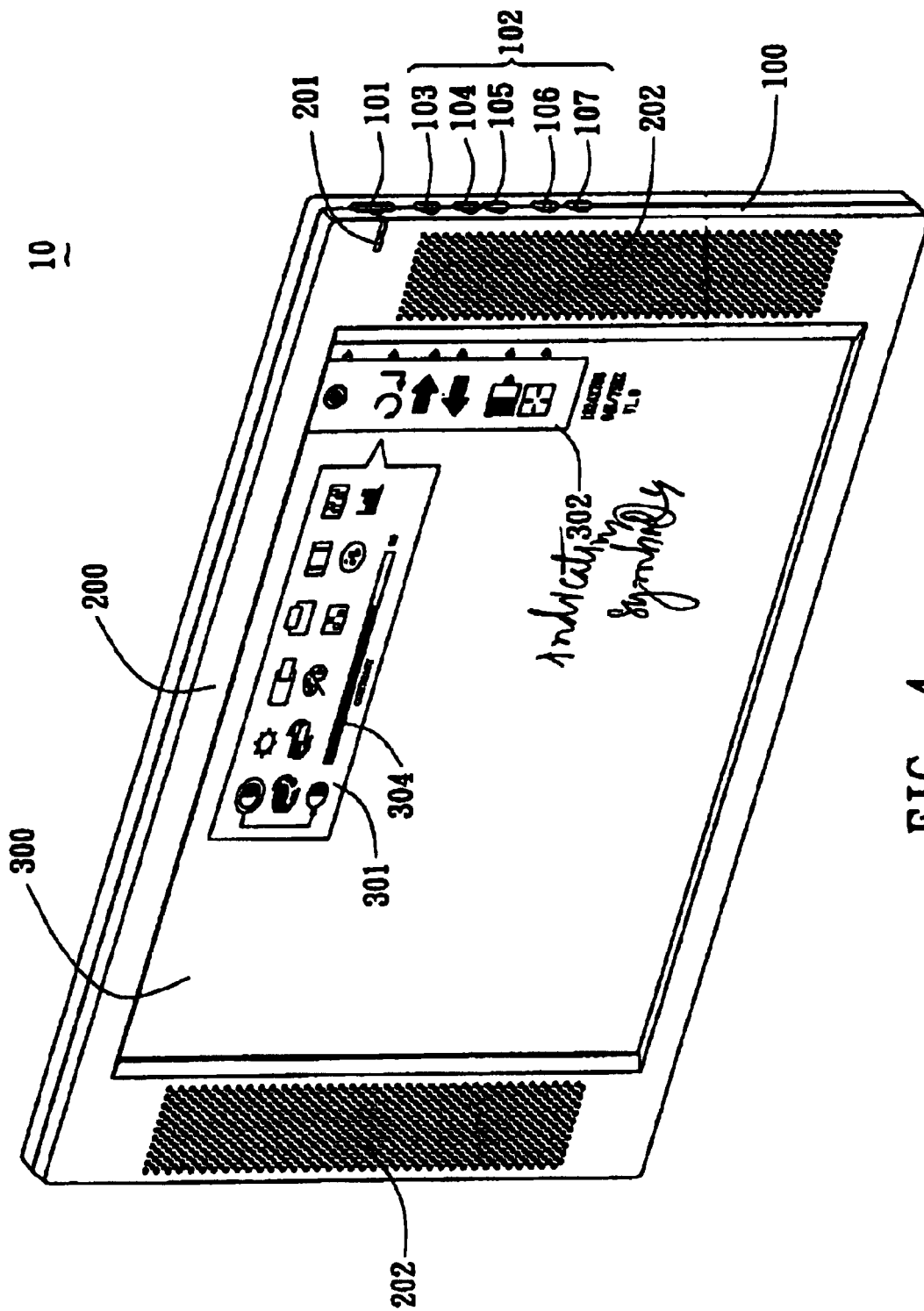
FIG. 4 is similar to FIG. 3, but showing a main menu and other indicating symbols displayed on the display screen of the flat panel display.
Figure 5:
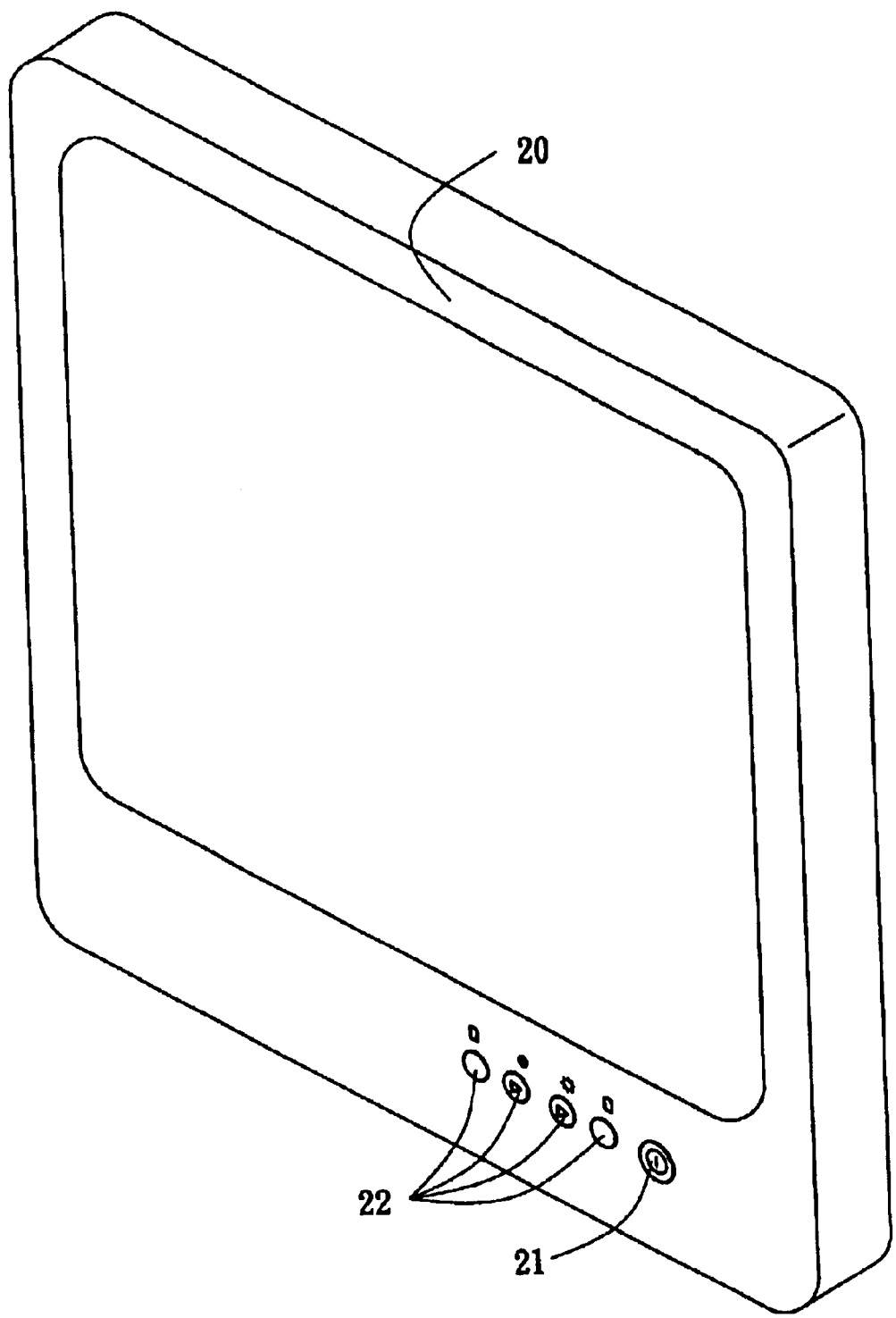
FIG. 5 is a perspective view of a conventional flat panel display.

FIG. 4 shows the flat panel display 10 when the user has selected contrast of the display screen 300 for adjustment. An adjustment bar 304 appears in the main menu 301. A length of the darkened position of the adjustment bar 304 indicates a degree of contrast. Guided by the indicating symbols 302, the user can press the adjusting buttons 104, 105 to adjust contrast (step 409). When the adjusting button 104 is pressed, the adjustment bar 304 extends rightward, and the contrast is progressively increased. When the adjusting button 105 is pressed, the darkened position of the adjustment bar 304 recedes leftward, and the contrast is progressively decreased. When the user is satisfied with the adjustment made, the user can press the first function button 103 to confirm the adjustment made (step 410). The adjustment bar 304 then disappears on the display screen 300 automatically. The procedure naturally proceeds to step 411 where the OSD main menu 301 and the indicating symbols 302 are displayed on the display screen 300 (see FIG. 4).

In step 411, the user decides whether to adjust another function of the display screen 300. If the user decides to continue to adjust a function of the display screen 300, the procedure logically proceeds to step 412, then back to step 407. If the user decides not to adjust another function, then in step 413 the user presses the second function button 106 and the main menu 301 disappears on the display screen 300. In step 414, the user decides whether to presses the automatic adjusting button 107 to adjust geometry, time clock or pixel phase of the display screen 300 automatically, or presses the second function button 106 to adjust volume of the speakers 202. If the user decides to adjust any of the above-mentioned functions, the procedure logically proceeds back to step 404. If the user decides not to adjust any of the above-mentioned functions, then in step 415 the symbols 302 disappear on the display screen 300 after 5 seconds if one of the control buttons 102 has not been pressed within those 5 seconds, whereupon the procedure for adjustment is ended (step 416).

Since the present invention provides the indicating symbols 302 indicating the functions and the positions of the control buttons 102, the user can adjust the display characteristics of the display screen 300 conveniently.

In the flat panel display 10 of the present invention, the buttons 102 are positioned on the side frame surface 100 and their use is indicated by the indicating symbols 302 appearing on the display screen 300. This arrangement enables a size of the flat panel display 10 to be reduced. In addition, the relatively uncluttered display function items shown on the main menu 301 and the indicating symbols 302 can be displayed large and clear and are more aesthetically pleasing. Furthermore, the indicating symbols permanently displayed on the bezel of a conventional display unit are not required on the flat panel display 10 of the present invention. That is, additional molding and/or printing of indicating symbols on the flat panel display 10 is not required. Therefore, manufacturing is simplified and costs are reduced.

Although the present invention has been described with reference to specific embodiments, it should be noted that the described embodiments are not necessarily exclusive and that various changes and modifications may be made to the described embodiments without departing from the scope of the present invention as defined by the appended claims.

What is claimed is:

1. A display unit comprising:
    a screen;
    a frame substantially surrounding the screen, the frame having a side surface;
    a speaker arranged behind the frame; and
    a plurality of buttons for adjusting display characteristics of the screen, arranged on the side surface of the frame;
    wherein when symbols of "on screen display" software appear on the screen, the symbols respectively indicate positions and functions of the buttons.

2. The display unit in accordance with claim 1, further comprising a switch arranged on the side surface of the frame.

3. The display unit in accordance with claim 2, further comprising an indicating light arranged on the frame.

4. The display unit in accordance with claim 3, wherein the switch and the indicating light are substantially at a same level.

5. The display unit in accordance with claim 1, wherein the symbols respectively point to the buttons.

6. A method of adjusting a display characteristic of a display unit, the method comprising the steps of:
    providing a display unit comprising:

a screen;

a frame substantially surrounding the screen, the frame having a side surface;

a speaker arranged behind the frame; and a plurality of buttons arranged on the side surface of the frame for adjusting display characteristics of the screen;

displaying symbols of "on screen display" software on the screen;

displaying a main menu of "on screen display" software on the screen;

adjusting a display characteristic of the screen by operating at least one of the buttons indicated by the symbols and the main menu;

closing the main menu; and closing the symbols.

7. The method of adjusting a display characteristic of a display unit in accordance with claim 6, wherein the symbols indicate positions and functions of the buttons.

8. The method of adjusting a display characteristic of a display unit in accordance with claim 6, wherein closing the main menu is performed by operating a predetermined one of the buttons.

9. The method of adjusting a display characteristic of a display unit in accordance with claim 6, wherein closing the symbols is automatically performed after a predetermined period of time has elapsed during which no button has been operated.

10. A display unit assembly comprising:

a screen;

a frame substantially surrounding said screen, said frame defining a front face and at least a side face joined with a side portion of said front face and perpendicular to said front face;

a speaker hidden behind said side portion and directing to said side portion; and a plurality of buttons for adjusting display characteristics of the screen provided on said side face.

11. The assembly in accordance with claim 10, wherein in operation, the screen displays symbols around a side section of the screen close to the side portion and in alignment with the corresponding buttons, respectively.

* * * * *